No. 866,911. PATENTED SEPT. 24, 1907.
B. F. BURCHFIELD & E. CONNER.
COOKING VESSEL.
APPLICATION FILED APR. 17, 1907.
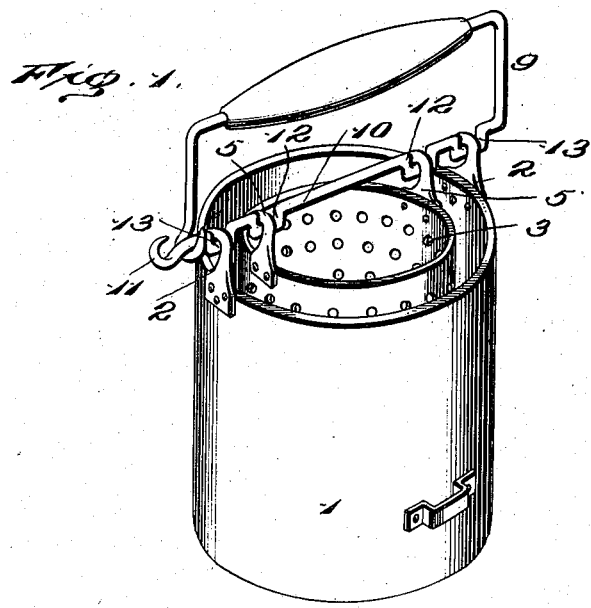
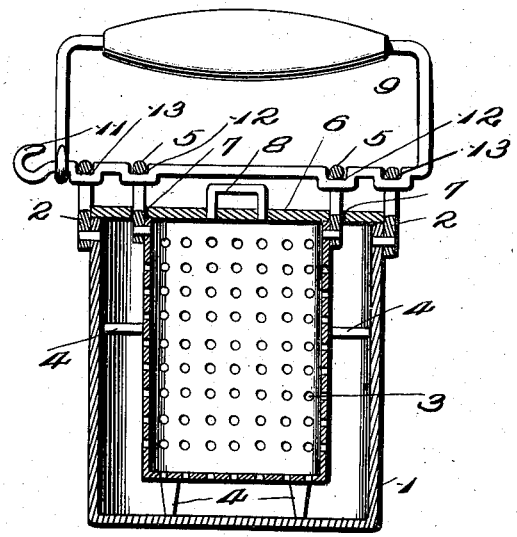
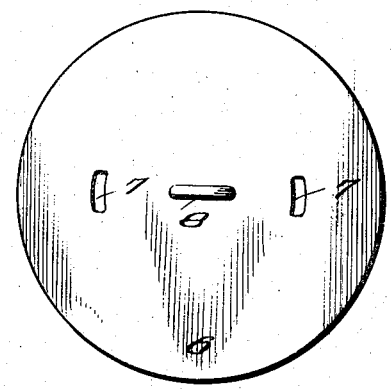
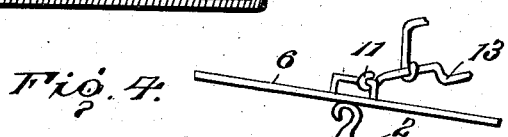
Witnesses
Inventors
B. F. Burchfield
E. Conner
Attorneys

UNITED STATES PATENT OFFICE.

BENJAMAN F. BURCHFIELD AND ELMER CONNER, OF ATHENS, OHIO.

COOKING VESSEL.

No. 866,911. Specification of Letters Patent. Patented Sept. 24, 1907.

Application filed April 17, 1907. Serial No. 368,767.

*To all whom it may concern:*

Be it known that we, BENJAMAN F. BURCHFIELD and ELMER CONNER, citizens of the United States, residing at Athens, in the county of Athens and State of Ohio, have invented certain new and useful Improvements in Cooking Vessels, of which the following is a specification.

The present invention relates to certain new and useful improvements in cooking utensils and more particularly to that type comprising an outer vessel and an inner perforated vessel received within the outer vessel and receiving the material being cooked whereby when the inner receptacle is removed the said material is automatically drained.

The invention contemplates novel means for handling the two vessels either individually or when assembled in an operative position, and consists essentially of a peculiarly formed bail having a detachable connection with both the inner vessel and the outer vessel.

For a full description of the invention and the merits thereof and also to acquire a knowledge of the details of construction and the means for effecting the result, reference is to be had to the following description and accompanying drawings, in which:

Figure 1 is a perspective view of a cooking utensil embodying the present invention, the cover being removed. Fig. 2 is a longitudinal sectional view through the device with the cover in position. Fig. 3 is a top plan view of the cover. Fig. 4 is a side elevation of the upper portion of the receptacle, the cover being shown as elevated by means of the handle.

Corresponding and like parts are referred to in the following description and indicated in all the views of the drawings by the same references characters.

Referring to the drawings the numeral 1 designates the outer vessel or receptacle which may be of any suitable configuration and which is provided at its upper edge with the upwardly extending hooked ears 2 which as in the present instance are preferably arranged diametrically opposite to each other.

Fitting removably within the outer receptacle 1 is an inner receptacle 3 which is formed of perforate material and which is smaller than the said outer receptacle. In order to hold the said inner receptacle in a spaced position from the bottom and sides of the outer receptacle 1, the former is provided with the feet or extensions 4. A pair of hooked ears 5 similar to the hooked ears 2 previously mentioned extend upwardly from the top of the inner receptacle 3. The cover 6 closing the mouth of the outer receptacle 1 fits between the hooked ears 2 and is formed with slots or openings 7 receiving the hooked ears 5 upon the inner vessel. This cover 6 is also shown as provided with the usual ring or finger-piece 8 for manipulating the same. The bail employed for handling the various elements comprises the usual arched portion 9 having the two arms thereof connected by the cross bar 10, one end of which terminates in a laterally projecting hook 11 designed to engage with the ring or finger-piece 8 of the cover and to form a means for manipulating the cover. This cross bar 10 has a detachable and interlocking engagement with the hooked ears 2 and 5 and is preferably formed with the crimped portions 12 for engagement with the hooks 2 and the corresponding crimped portions 13 for engagement with the hooks 5.

It will thus be apparent that when the two vessels are in an assembled position the crimped portions 12 of the bail can be engaged with the hooks 5 and the inner vessel thereby readily removed, or the crimped portions 13 can be engaged with the hooks 2 and the outer vessel moved in the usual manner. Should it be desired to engage the bail with both the outer and inner vessel the desired result can be accomplished by turning the inner vessel until the ears 5 are in alinement with the ears 2.

Having thus described the invention, what is claimed as new is:

1. The combination of a vessel, a cover for the vessel, an arched handle detachably connected to the vessel, and means carried by the handle for lifting the cover when detached from the vessel.

2. The combination of a vessel, a cover for the vessel provided with a finger piece, an arched handle having a detachable connection with the vessel, and a hook carried by the handle for engaging the finger piece of the cover when the handle is detached from the vessel.

3. The combination of an outer vessel provided with ears, an inner vessel received within the outer vessel and also provided with ears, and a detachable bail comprising a cross bar having an interlocking connection with both of the before mentioned sets of ears.

4. The combination of an outer vessel provided with hooked ears, an inner vessel received within the outer vessel and also provided with hooked ears, and a detachable bail comprising a cross bar designed to have an interlocking connection with both of the before mentioned sets of ears.

5. The combination of an outer vessel provided with hooked ears, an inner vessel received within the outer vessel and also provided with hooked ears, and a detachable bail comprising a cross bar provided with crimped portions designed to have an interlocking connection with the before mentioned ears.

6. The combination of an outer vessel provided with ears, a cover for the said vessel provided with a finger piece, an inner vessel received within the outer vessel and provided with ears, and a detachable bail comprising a cross bar intermediate portions of which have an interlocking connection with the before mentioned ears, the said cross bar being provided at its extremity with a hook adapted to engage the finger piece of the cover.

7. The combination of an outer vessel provided with ears, an inner vessel received within the outer vessel and also provided with ears, and a handle comprising a member designed to have an interlocking connection with either or both of the before mentioned sets of ears.

In testimony whereof we affix our signatures in presence of two witnesses.

BENJAMAN F. BURCHFIELD. [L. S.]
    ELMER CONNER. [L. S.]

Witnesses:
 JAMES F. WOOD,
 HARRY M. ROACH.